United States Patent
Aoyama et al.

(10) Patent No.: US 12,060,939 B2
(45) Date of Patent: Aug. 13, 2024

(54) CONTROL APPARATUS FOR VEHICLE

(71) Applicant: TOYOTA JIDOSHA KABUSHIKI KAISHA, Toyota (JP)

(72) Inventors: Nozomi Aoyama, Toyota (JP); Tomoya Nagano, Numazu (JP); Hideki Amano, Toyota (JP); Yuki Matsuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/337,700

(22) Filed: Jun. 20, 2023

(65) Prior Publication Data

US 2023/0407965 A1 Dec. 21, 2023

(30) Foreign Application Priority Data

Jun. 21, 2022 (JP) ................ 2022-099913

(51) Int. Cl.
*F16H 63/34* (2006.01)
*F16H 63/48* (2006.01)

(52) U.S. Cl.
CPC ....... *F16H 63/3466* (2013.01); *F16H 63/486* (2013.01)

(58) Field of Classification Search
CPC . F16H 63/3425; F16H 63/3466; F16H 63/486
USPC .......................................... 74/335
See application file for complete search history.

(56) References Cited

U.S. PATENT DOCUMENTS

| | | | | |
|---|---|---|---|---|
| 10,883,598 B2 * | 1/2021 | Gebert | ............ | F16H 63/38 |
| 11,168,788 B2 * | 11/2021 | Gebert | ............ | F16H 63/3491 |
| 11,248,702 B2 * | 2/2022 | Grunwald | ............ | F16H 63/3425 |
| 11,313,464 B2 * | 4/2022 | Miebach | ............ | B60T 1/005 |
| 11,608,891 B2 * | 3/2023 | Davis | ............ | F16H 63/304 |
| 2020/0040993 A1 * | 2/2020 | Gebert | ............ | F16H 63/3491 |
| 2022/0186831 A1 * | 6/2022 | Loui | ............ | F16D 41/16 |

FOREIGN PATENT DOCUMENTS

| | | |
|---|---|---|
| JP | H05280637 A | 10/1993 |
| JP | 2011080565 A | 4/2011 |

\* cited by examiner

*Primary Examiner* — Ha Dinh Ho
(74) *Attorney, Agent, or Firm* — Hunton Andrews Kurth LLP (57) ABSTRACT

A control apparatus for a vehicle that is provided with an electric parking device for causing a parking pawl to be meshed with a parking gear so as to lock rotation of a wheel of the vehicle. When a parking range is selected, a parking control is executed for moving the parking pawl to a parking position in which the parking pawl is meshed with the parking gear. When the parking control is to be executed, it is determined whether or not the electric parking device is in a ratcheting state in which the parking pawl is repelled by the parking gear without the parking pawl being meshed with the parking gear. When it is determined that the electric parking device is in the ratcheting state, the parking control is stopped to move the parking pawl to a non-parking position.

11 Claims, 6 Drawing Sheets

CONTROL APPARATUS FOR VEHICLE

This application claims priority from Japanese Patent Application No. 2022-099913 filed on Jun. 21, 2022, the disclosure of which is herein incorporated by reference in its entirety.

FIELD OF THE INVENTION

The present invention relates to a vehicle control apparatus, and more particularly to such a control for a vehicle that is provided with an electric parking device.

BACKGROUND OF THE INVENTION

There is a known a control apparatus for a vehicle that is provided with (i) a wheel, (ii) an electric parking device which is includes a parking gear that is to be rotated in conjunction with the wheel and a parking pawl that is to be meshed with the parking gear, and which is configured to lock rotation of the wheel by causing the parking pawl to be meshed with the parking gear through an electric control, and (iii) a range selection device capable of selecting a plurality of ranges that establish respective different driving states of the vehicle, wherein the plurality of ranges include a parking range that causes the wheels to be locked to be unrotatable by the electric parking device, wherein the control apparatus includes a parking control portion configured, when the parking range is selected, to execute a parking control for moving the parking pawl to a parking position in which the parking pawl is meshed with the parking gear in the electric parking device. An example of such a such control apparatus is disclosed in JP-H05-280637A. In the control apparatus disclosed in the Japanese Patent Application Publication, switching to the parking range is allowed when an actual value of a running speed of the vehicle is not higher than a predetermined speed value, and is inhibited when the actual value of the running speed is higher than the predetermined speed value, so as to suppress sudden stop of the vehicle and occurrence of ratcheting that is a phenomenon in which the parking pawl is repeatedly repelled by the parking gear without being meshed with the parking gear.

SUMMARY OF THE INVENTION

However, in the above-described control apparatus, due to individual differences of each vehicle, such as dimensional errors of the parking pawl and the parking gear, and accuracy error of a vehicle speed sensor, there is a case in which the ratcheting occurs even by allowing the switching to the parking range only when the actual value of the vehicle running speed is not higher than the predetermined speed value and inhibiting the switching to the parking range when the actual value of the vehicle running speed is higher than the predetermined speed value. If the ratcheting continues, there is a risk of reduction of durability of the parking pawl and the parking gear. It might be possible to prevent occurrence of the ratcheting in spite of the individual differences of each vehicle, for example, by reducing the above-described predetermined speed value so as to more restrict the switching to the parking range. However, in this case, the switching to the parking range is likely to be restricted more than necessary.

The present invention was made in view of the background art described above. It is therefore an object of the present invention to appropriately suppress the ratcheting upon switching to the parking range in spite of the individual differences of each vehicle.

The object indicated above is achieved according to the following aspects of the present invention.

According to a first aspect of the invention, there is provided a control apparatus for a vehicle that is provided with (i) a wheel, (ii) an electric parking device which includes a parking gear that is to be rotated in conjunction with the wheel and a parking pawl that is to be meshed with the parking gear, and which is configured to lock rotation of the wheel by causing the parking pawl to be meshed with the parking gear through an electric control, and (iii) a range selection device capable of selecting a plurality of ranges that establish respective different driving states of the vehicle, wherein the plurality of ranges include a parking range that causes the wheel to be locked to be unrotatable by the electric parking device. The control apparatus includes a parking control portion configured, when the parking range is selected, to execute a parking control for moving the parking pawl to a parking position in which the parking pawl is meshed with the parking gear in the electric parking device. The parking control portion is configured, when being to execute the parking control, to determine whether or not the electric parking device is in a ratcheting state in which the parking pawl is repelled by the parking gear without the parking pawl being meshed with the parking gear, and is configured, when determining that the electric parking device is in the ratcheting state, to stop the parking control so as to move the parking pawl to a non-parking position in which meshing of the parking pawl with the parking gear is released.

According to a second aspect of the invention, in the control apparatus according to the first aspect of the invention, the parking control portion is configured, after stopping the parking control by determining that the electric parking device is in the ratcheting state, to re-execute the parking control when a predetermined re-execution condition is satisfied.

According to a third aspect of the invention, in the control apparatus according to the second aspect of the invention, the re-execution condition is that an actual value of a running speed of the vehicle has been reduced from a reference speed value, which is the running speed upon determination that the electric parking device is in the ratcheting state, by at least a predetermined reduction value.

According to a fourth aspect of the invention, in the control apparatus according to the second or third aspect of the invention, the re-execution condition is that an elapsed time from determination that the electric parking device is in the ratcheting state, has become at least a predetermined time value.

According to a fifth aspect of the invention, in the control apparatus according to any one of the first through fourth aspects of the invention, the vehicle is provided with an electric braking device configured to electrically control a braking force of the vehicle, wherein the control apparatus includes a braking control portion that is configured to cause the electric braking device to generate the braking force when the parking control portion stops the parking control by determining that the electric parking device is in the ratcheting state.

According to a sixth aspect of the invention, in the control apparatus according to the fifth aspect of the invention, the braking control portion is configured to keep the electric braking device to generate the braking force, until an actual value of a running speed of the vehicle has been reduced from a reference speed value, which is the running speed upon determination that the electric parking device is in the ratcheting state, by at least a predetermined reduction value.

According to a seventh aspect of the invention, in the control apparatus according to the fifth or sixth aspect of the invention, the braking control portion is configured to keep the electric braking device to generate the braking force, until an elapsed time from determination that the electric parking device is in the ratcheting state, has become at least a predetermined time value.

According to an eighth aspect of the invention, in the control apparatus according to any one of the fifth through seventh aspects of the invention, when the parking control portion re-executes the parking control when a predetermined re-execution condition is satisfied, the braking control portion is configured to keep the electric braking device to generate the braking force.

According to a ninth aspect of the invention, in the control apparatus according to the eighth aspect of the invention, the parking control portion is configured, when the re-execution condition is satisfied, to re-execute the parking control and to determine whether the electric parking device is in the ratcheting state or not, and is configured to repeat re-execution of the parking control upon satisfaction of the re-execution condition, until determining that the electric parking device is not in the ratcheting state, wherein the braking control portion is configured to stop the electric braking device to generate the braking force, when the parking control portion becomes determining that the electric parking device is not in the ratcheting state.

According to a tenth aspect of the invention, in the control apparatus according to any one of the second through fourth aspects of the invention, the vehicle is provided with an electric braking device configured to electrically control a braking force of the vehicle, wherein the control apparatus includes a braking control portion that is configured to cause the electric braking device to generate the braking force, in a case in which the parking control portion stops the parking control by determining again that the electric parking device is in the ratcheting state, when re-executing the parking control upon satisfaction of the predetermined re-execution condition. It is noted that, in this tenth aspect of the invention, the braking force is generated in the case in which it is determined again that the electric parking device is in the ratcheting state during the re-execution of the parking control that is made as a result of satisfaction of the re-execution condition, and that the braking force may be either generated or not generated in a case in which it is determined that the electric parking device is in the ratcheting state during first execution of the parking control.

According to an eleventh aspect of the invention, in the control apparatus according to the tenth aspect of the invention, the parking control portion is configured, when the re-execution condition is satisfied, to re-execute the parking control and to determine whether the electric parking device is in the ratcheting state or not, and is configured to repeat re-execution of the parking control upon satisfaction of the re-execution condition, until determining that the electric parking device is not in the ratcheting state, wherein the braking control portion is configured to keep the electric braking device to generate the braking force, until the parking control portion becomes determining that the electric parking device is not in the ratcheting state.

In the control apparatus according to each one of the first through eleventh aspects of the invention, the parking control portion is configured, when being to execute the parking control, to determine whether or not the electric parking device is in the ratcheting state, and is configured, when determining that the electric parking device is in the ratcheting state, to stop the parking control so as to move the parking pawl to the non-parking position, so that it is possible to appropriately suppress occurrence of ratcheting regardless of individual differences for each vehicle.

In the control apparatus according to each one of the second through fourth aspects of the invention, when the re-execution condition is satisfied after the parking control has been stopped, the parking control is re-executed so that it is possible to quickly position the parking pawl into the parking position, namely, to quickly switch the electric parking device to a parking state by re-executing the parking control, while suppressing occurrence of the ratcheting. Particularly, in the control apparatus according to the third aspect of the invention, the re-execution of the parking control is made depending on an amount of reduction of the running speed of the vehicle, i.e., an amount of reduction of a rotational speed of the parking gear, so that the parking pawl is more likely to be meshed with the parking gear by the reduction of the rotational speed of the parking gear, thereby reducing a number of times of occurrence of the ratcheting and also a number of times of execution of the parking control, and accordingly reducing consumption of an electric power.

In the control apparatus according to each one of the fifth through ninth aspects of the invention, when the parking control is stopped by determination that the electric parking device is in the ratcheting state, the braking force is generated by the electric braking device, so that it is possible to obtain a certain amount of the braking force in spite of stop of execution of the parking control thereby preventing a driver of the vehicle from feeling discomfort. Further, the running speed of the vehicle is reduced by the braking force generated by the electric braking device whereby the rotational speed of the parking gear is reduced, so that the electric parking device can be quickly switched to the parking state in which the parking pawl is meshed with the parking gear, by the re-execution of the parking control. In the control apparatus according to the ninth aspect of the invention, when the parking control portion becomes determining that the electric parking device is not in the ratcheting state, the generation of the braking force by the electric braking device is stopped, so that application of the braking force can be controlled to the minimum required.

In the control apparatus according to each one of the tenth and eleventh aspects of the invention, the braking force is generated by the electric braking device, in the case in which the parking control portion stops the parking control by determining again that the electric parking device is in the ratcheting state, when re-executing the parking control upon satisfaction of the predetermined re-execution condition. Therefore, since the running speed of the vehicle is reduced by the braking force whereby the rotational speed of the parking gear is reduced, so that the electric parking device can be quickly switched to the parking state in which the parking pawl is meshed with the parking gear, by the re-execution of the parking control.

DETAILED DESCRIPTION OF PREFERRED EMBODIMENTS

The electric parking device is a parking device of so-called "shift-by-wire (SBW)" type, which is configured to electrically establish one of the ranges selected by the range selection device such as a shift lever, by an electrically-operated shift actuator. The ranges include the parking range (P range) that causes the wheel to be mechanically locked to be unrotatable, so that, when the parking range is selected, the electric parking device is placed in the parking state in which the parking pawl is meshed with the parking gear. It is preferable that a power transmission is cut off in the parking range. The present invention is applicable to any one of various types of vehicles such as an engine drive vehicle that generates a power by combustion of a fuel, an electric vehicle that generates a power by an electric motor, and a hybrid electric vehicle provided with a plurality of power sources.

The parking gear is provided on a rotary shaft (such as an output shaft) that is to be rotated mechanically in conjunction with the wheel of the vehicle, so that the rotary shaft and the wheel are mechanically inhibited from being rotated when the parking pawl is meshed with the parking gear. The parking pawl is to be moved in opposite directions between its parking position and non-parking position by an actuator such as an electric motor. Between the parking pawl and the actuator, a biasing device such as a spring member is provided, as needed, to allow movement of the parking pawl relative to the parking gear when the parking pawl interfere with the parking gear. The ratcheting in which the parking pawl is repelled by the parking gear without the parking pawl being meshed with the parking gear, is caused with the parking pawl being repeatedly repelled by a plurality of teeth of the parking gear, against the biasing force of the biasing device, by rotation of the parking gear. Whether the electric parking device is in the ratcheting state or not can be determined based on a position of the parking pawl, for example. However, this determination can be made also based on the rotational speed of the wheel or the rotational speed of the parking gear.

The re-execution condition, which is to be satisfied to re-execute the parking control after the parking control has been stopped, may include a condition relating to an amount of reduction of the running speed of the vehicle after determination that the electric parking device is in the ratcheting state, a condition relating to an elapsed time after the determination that the electric parking device is in the ratcheting state and/or a condition relating to a running distance of the vehicle after the determination that the electric parking device is in the ratcheting state. The re-execution condition may include various kinds of conditions. The electric braking device, which is configured to generate the braking force when the parking control is stopped as a result of the determination that the electric parking device is in the ratcheting state, may be constituted by an electric wheel braking device in which a hydraulic pressure serving as a wheel brake is to be electrically controlled, or an electric motor which serves a power generator as well as a drive power force (for driving the vehicle) and which is subjected to a regenerative control for generating the braking force. It is noted that application of the braking force by the electric braking device may be omitted.

Embodiments

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of the embodiments.

Figure 1:
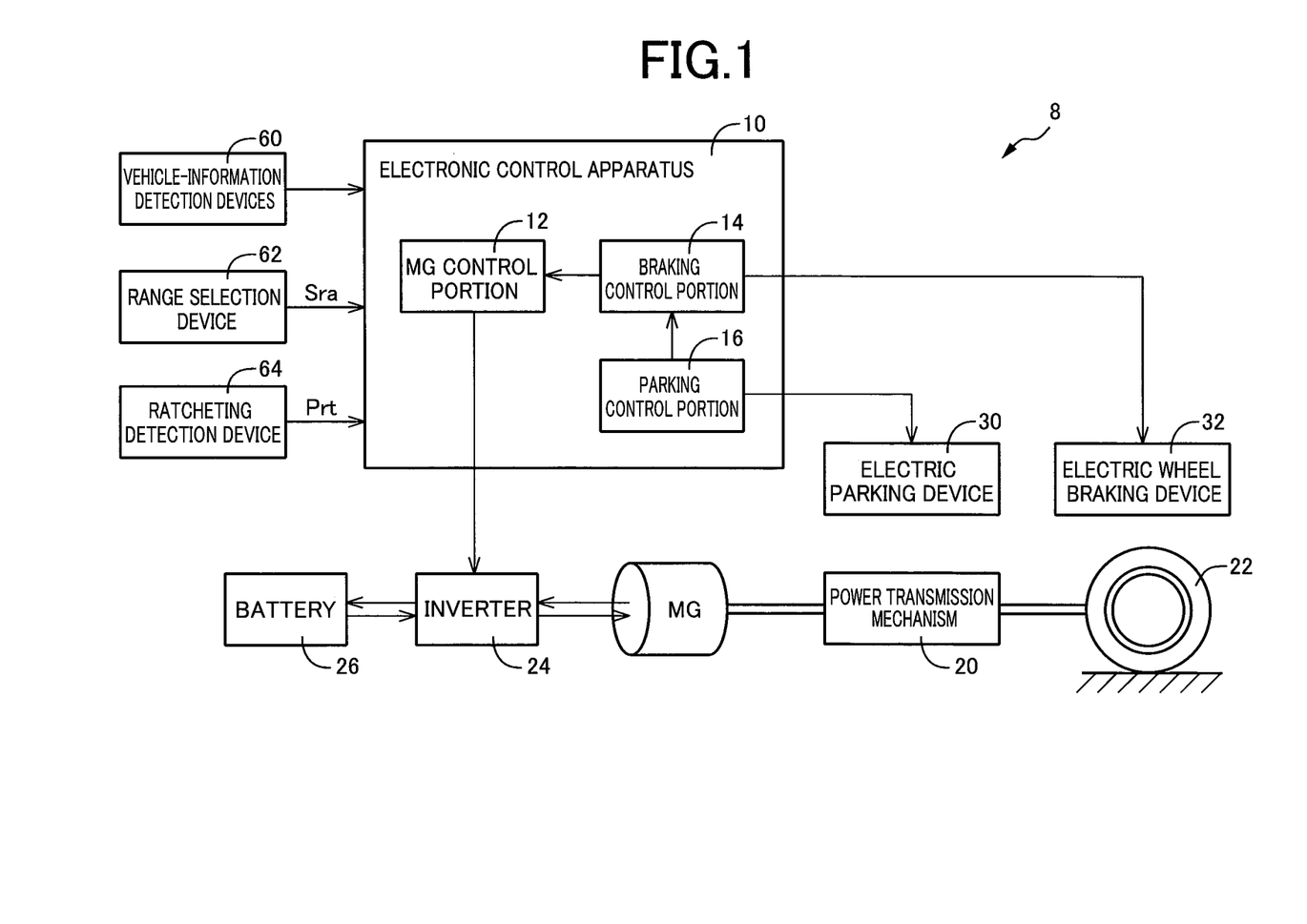
FIG. 1 is a block diagram schematically showing a construction of a vehicle including an electronic control apparatus as a control apparatus according to an embodiment of the present invention, together with major parts of a control system.

FIG. 1 is a block diagram schematically showing a construction of a vehicle 8 including an electronic control apparatus 10 as a control apparatus according to an embodiment of the present invention, together with major parts of a control system. The vehicle 8 is an electric vehicle provided with an electric motor MG as a drive power source for driving the vehicle 8. The electric motor MG is a so-called "motor generator" serving also as an electric generator. The electric motor MG is mechanically connected to a wheel 22 through a power transmission mechanism 20 such as a trans axle, and is electrically connected to a battery 26 through an inverter 24. The vehicle 8 is provided with an electric parking device 30 that is capable of locking rotation of the wheel 22 through an electric control, and an electric wheel braking device 32 that is configured to generate a braking force trough an electric control.

Figure 2:
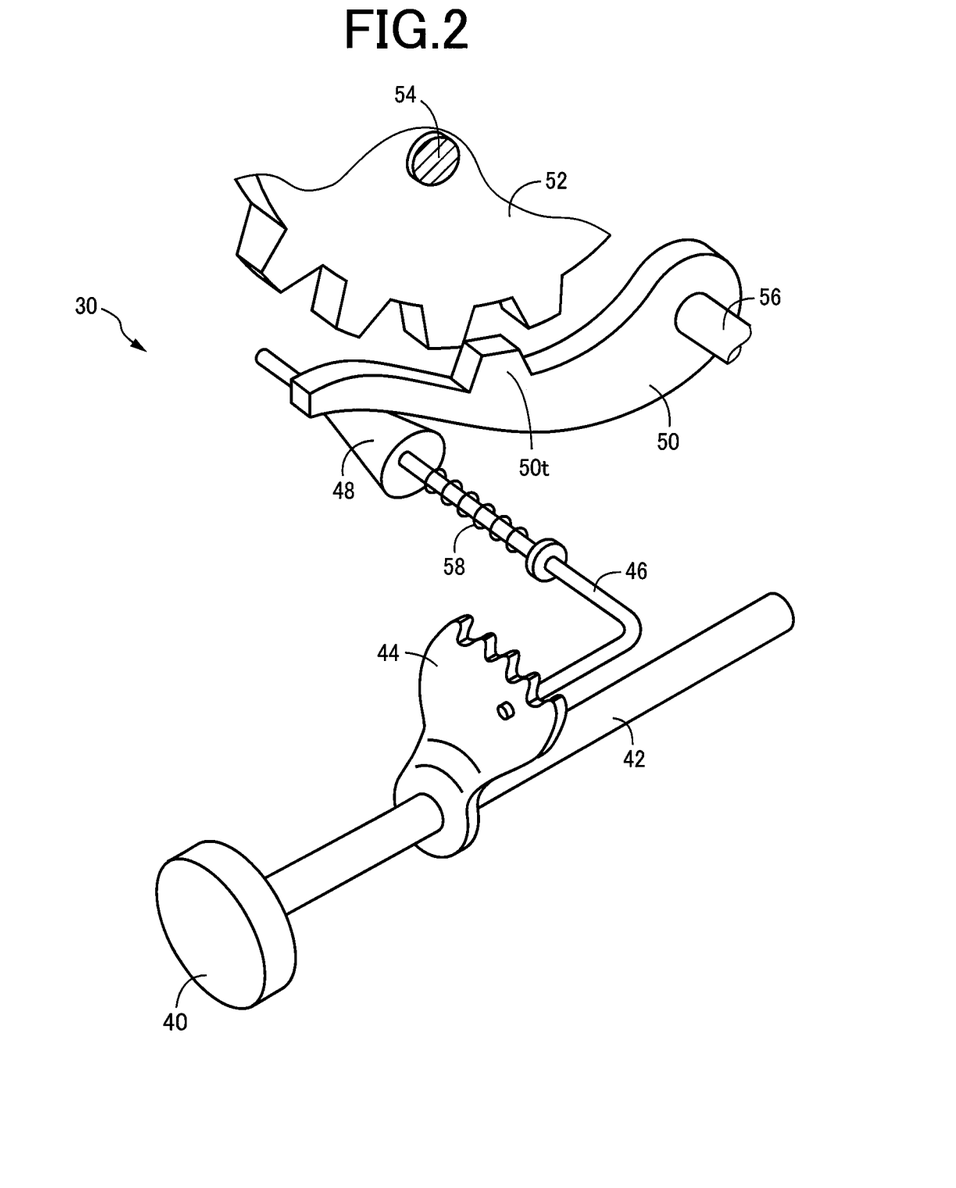
FIG. 2 is a perspective view schematically showing, by way of example, an electric parking device included in the vehicle of FIG. 1.

FIG. 2 is a perspective view schematically showing, by way of example, the electric parking device 30. This electric parking device 30 is a parking device of SBW type, which is configured to electrically switch among a plurality of ranges that establish respective different driving states of the vehicle 8, by operating an SBW actuator 40, which is constituted by an electric motor, for example, depending on a range selected by a range selection device 62 (see FIG. 1) that is constituted by a shift lever or the like, so as to pivot a detent plate 44 though a shift shaft 42. The range selection device 62 is disposed in vicinity of a driver's seat, and is capable of selecting various ranges such as a P (parking) range for parking the vehicle 8, an R (reverse) range for reverse driving of the vehicle 8, a N (neutral) range for cutting of a power transmission, and a D (drive) range for forward driving of the vehicle 8. The range selection device 62 outputs a signal indicative of a selected range Sra that is a currently selected one of the these ranges, and the outputted signal is supplied to the electronic control apparatus 10. In the P range, as well as in the N range, the power transmission is cut off.

The detent plate 44 is to be pivoted about an axis of the shift shaft 42 by the SBW actuator 40 so as to be positioned in four pivot positions which consist of a P position for the P range, an R position for the R range, an N position for the N range and a D position for the D range. A parking rod 46 is connected to the detent plate 44, such that the parking rod 46 is to be substantially linearly moved by pivot motion of the detent plate 44. An operation state of the electric parking device 30 is switched depending on a position of the parking rod 46. A parking head 48 is connected to a distal end portion of the parking rod 46. When the parking head 48 is forwardly moved from its non-parking position as shown in FIG. 2 to its parking position that is located on an upper left side of the non-parking position (as seen in FIG. 2), a parking pawl 50 is pivoted in clockwise direction (as seen in FIG. 2) whereby a meshing tooth 50t of the parking pawl 50 is meshed with a parking gear 52, thereby establishing a parking state. The parking head 48 has a tapered body, so that the parking pawl 50 is moved upwardly by a tapered surface of the parking head 48, so as to be pivoted in the clockwise direction. Regarding the electric parking device 30, the above-described P position will be referred to as "parking position" while each of the other positions (other than the P position) will be collectively referred to as "non-parking position", for explaining operation the SBW actuator 40 in a simplified manner. It is noted that the electric parking device 30 may be modified in various manners, for example, such that the parking head 48 include a roller or a plurality of rollers, or such that an electromagnet is provided to move the parking pawl 50 so as to electrically switch between the parking state and the non-parking state of the electric parking device 30.

The parking gear 52 is fixed to a rotary shaft 54 unrotatably relative to the rotary shaft 54, wherein the rotary shaft 54 corresponds to, for example, an output shaft of the power transmission mechanism 20 that is to be mechanically rotated together with the wheel 22. The parking pawl 50 is disposed in a transmission casing or the like, such that the parking pawl 50 is pivotable about an axis of a pawl shaft 56 that is parallel to the rotary shaft 54. The parking pawl 50 is biased, by a return spring (not shown), in counterclockwise direction (as seen in FIG. 2), i.e., in a direction that releases the meshing. The parking pawl 50 is pivoted by the parking head 48, against biasing force of the return spring, in clockwise direction (as seen in FIG. 2), i.e., in a direction that engages the meshing. That is, the parking pawl 50 is disposed to be movable toward and away from the parking gear 52, so as to be positioned in its parking position in which the meshing of the meshing tooth 50t with the parking gear 52 is established, and its non-parking position in which the meshing of the meshing tooth 50t with the parking gear 52 is released, as shown in FIG. 2. With the parking pawl 50 being positioned in the parking position in which the meshing tooth 50t is meshed with the parking gear 52, the electric parking device 30 is placed in the parking state in which rotation of the parking gear 52 and further rotations of the rotary shaft 54 and the wheel 22 are mechanically inhibited.

The parking head 48 is disposed to be movable relative to the parking rod 46 in an axial direction of the parking rod 46. The parking head 48 is normally held in a distal-end side position (i.e., upper-left side position as seen in FIG. 2) relative to the parking rod 46 owing to a biasing device in the form of a spring member (compression coil spring in the present embodiment) 58. When the SBW actuator 40 is operated from the non-parking position to the parking position, the parking pawl 50 is pivoted through the parking head 48 to the parking position. However, when the meshing tooth 50t of the parking pawl 50 interferes with a tooth of the parking gear 52, the parking head 48 is allowed to be moved relative to the parking rod 46 against the biasing force of the spring member 58 in lower right direction as seen in FIG. 2. In this instance, if the parking gear 52 is rotated, for example, by a road slope, the parking pawl 50 is meshed with the parking gear 52 owing to the biasing force of the spring member 58 whereby the parking state is established in the electric parking device 30. Further, when the P range is selected during running of the vehicle 8, there is a possibility of occurrence of ratcheting in which the parking pawl 50 is repeatedly repelled by the plurality of teeth of the parking gear 52, against the biasing force of the spring member 58, by rotation of the parking gear 52. That is, even though each of the SBW actuator 40 and the parking rod 46 is operated to the parking position, the electric parking device 30 is held in a state that allows running of the vehicle 8 as long as each of the parking head 48 and the parking pawl 50 does not reach the parking position.

The electric wheel braking device 32 includes a brake master cylinder (not shown) configured to generate a brake hydraulic pressure and a cylinder actuator (not shown), and is configured to electrically control a brake hydraulic pressure, i.e., a braking force applied to each of wheel brakes provided in all wheels of the vehicle 8 that include the wheel 22. In the electric wheel brake device 32, in a normal case, the brake hydraulic pressure is generated, for example, depending on a stepping operation of a brake pedal which represents a requested speed reduction amount Bra requested by a driver of the vehicle 8. On the other hand, in the electric wheel brake device 32, in a particular control, for example, when a particular control is executed, the brake hydraulic pressure is electrically controlled to obtain a wheel braking torque TBw that is required in the particular control, wherein the particular control includes an ABS control for preventing a wheel lock, a sideslip suppressing control, an automatic speed control, an automatic drive control and an automatic brake control.

The electronic control apparatus 10 includes a so-called microcomputer incorporating a CPU, a ROM, a RAM and an input-output interface. The CPU performs various control operations of the vehicle 8, by processing various input signals, according to control programs stored in the ROM, while utilizing a temporary data storage function of the RAM. The electronic control apparatus 10 is configured to receive the above-described signal indicative of the selected range Sra selected by the electronic control apparatus 10, and various vehicle information or data required for performing various controls in the vehicle 8, which is supplied from vehicle-information detection devices 60. The vehicle information includes, for example, the above-described requested speed reduction amount Bra, an accelerator opening degree θacc representing an amount of accelerating operation such as a stepping operation of an accelerator pedal made by the vehicle driver, an MG rotational speed Nm that is a rotational speed of the electric motor MG, a rotational speed Nout of the output shaft of the power transmission mechanism 20 that corresponds to a running speed V of the vehicle 8 and a wheel speed ωfr that is a rotational speed of each of all the wheels including the wheel 22. The above-described vehicle-information detection devices 60 include various sensors such as a rotational angular sensor, a load sensor and a vehicle running speed sensor.

The electronic control apparatus 10 is configured to further receive, from the ratcheting detection device 64, a ratcheting information Prt that makes it possible to determine whether the electric parking device 30 is in the ratcheting state or not. The ratcheting detection device 64 includes a proximity switch or a limit switch that is to be turned ON or OFF when the parking pawl 50 has been pivoted to the parking position, or an angle sensor that is configured to detect a pivot angle of the parking pawl 50, and is capable of determining that the electric parking device 30 is in the ratcheting state when the parking pawl 50 has not been pivoted to the parking position although the SBW actuator 40 has been operated to the parking position during running of the vehicle 8. The ratcheting detection device 64 may determine that the electric parking device 30 is in the ratcheting state also when the pivot angle of the parking pawl 50 is repeatedly increased or reduced around a predetermined angle value. Further, the ratcheting detection device 64 may determine whether the electric parking device 30 is in the ratcheting state or not, also depending whether the wheel speed ωfr or the MG rotational speed Nm corresponding to a rotational speed of the parking gear 52 has been reduced or not, or has been zeroed or not, instead of detecting position of the parking pawl 50.

The electronic control apparatus 10 functionally includes an MG control portion 12, a braking control portion 14 and a parking control portion 16.

The MG control portion 12 calculates a drive request amount requested to the vehicle 8 by the driver, by applying the accelerator opening degree θacc and the running speed V to a drive request amount map, for example. The drive request amount map represents a relationship which is obtained by experimentation or determined by an appropriate design theory, and is stored so as to be used for obtaining the drive request amount. The drive request amount is, for example, a requested drive torque Trdem [Nm], a requested drive force Frdem [N] or a requested drive power Prdem [W] that is to be applied to the wheel 22. The MG control portion 12 calculates a target MG torque Tmtgt that realizes a requested drive amount, by taking account of various factors such as a transmission loss, an auxiliary load and a gear ratio of the power transmission mechanism 20, and then controls the electric motor MG through the inverter 24 such that the target MG torque Tmtgt is outputted by the electric motor MG.

The braking control portion 14 determines a requested braking torque TBdem, based on various factors such as an acceleration operation made by the vehicle driver (e.g., a rate of reduction of the accelerator opening degree θacc or accelerator opening degree θacc), the running speed V, a downhill slope and the requested speed reduction amount Bra (that is represented by a brake operation made by the vehicle driver, for example). During decelerated running of the vehicle 8, the braking control portion 14 generates a braking torque TB of the vehicle 8 such that the requested braking torque TBdem can be obtained. The requested braking torque TBdem is basically the requested braking torque for the wheel braking torque TBw by the electric wheel braking device 32. Although the requested braking torque TBdem is realized by the wheel braking torque TBw, the requested braking torque TBdem may be realized also by a regenerative braking torque TBr together with the wheel braking torque TBw, or by the regenerative braking torque TBr with higher priority, from a viewpoint of improving energy efficiency. The regenerative braking torque TBr is the braking torque TB obtained by regenerative braking of the electric motor MG, and is generated by a regenerative control of the electric motor MG by the MG control portion 12. The regenerative torque of the electric motor MG corresponds to the MG torque Tm during regeneration of the electric motor MG, which is obtained by converting the regenerative braking torque TBr applied to the wheel 22, based on, for example, the gear ratio of the power transmission mechanism 20.

The parking control portion 16 is configured to switch the operation state of the electric parking device 30, depending on the selected range Sra selected by the range selection device 62. To this end, specifically, the parking control portion 16 executes a control routine shown by a flow chart of FIG. 3, wherein the control routine includes steps S1 to S10 at each of which signal processing executed. It is noted that, in the flow chart of FIG. 3, "YES" and "NO" in each of determination steps S1, S3, S7 and S9 (represented by rhombus shapes) represent affirmative determination and negative determination, respectively. Each of FIGS. 4 and 5 is an example of time chart showing changes of operation states of respective parts in a case in which a parking control is executed, upon selection of the P range, to establish the parking state in the electric parking device 30, in accordance with the flow chart of FIG. 3.

Figure 3:
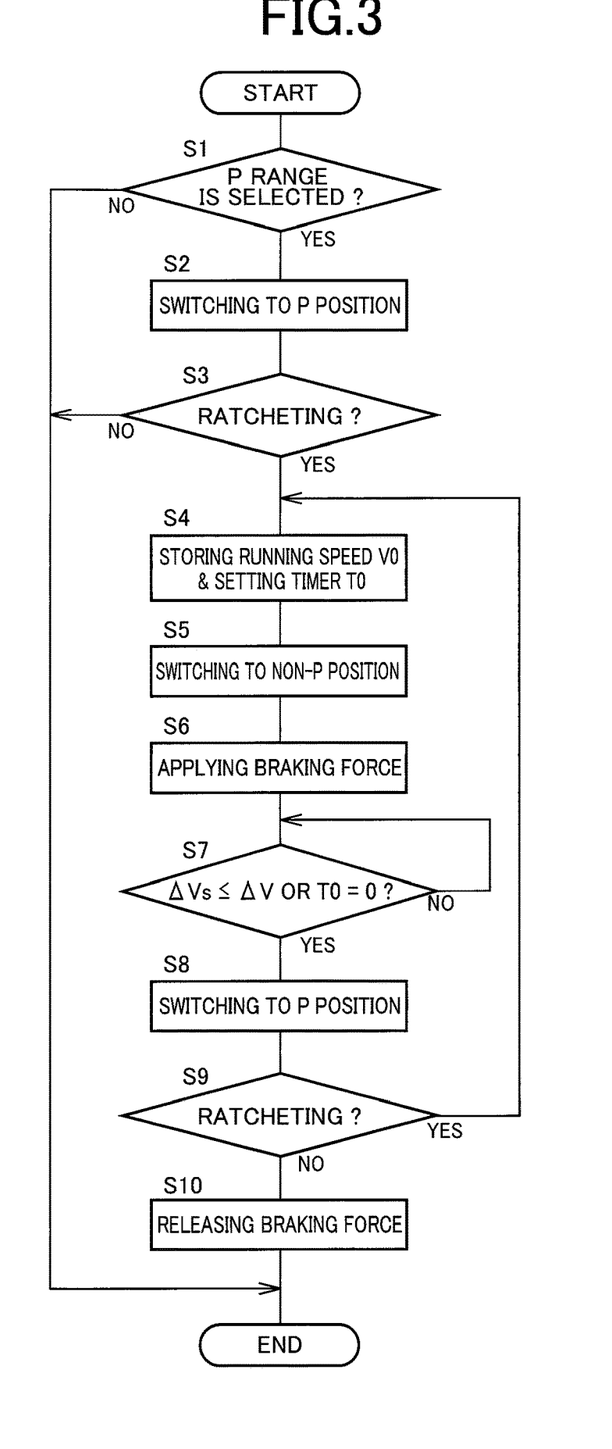
FIG. 3 is a flow chart showing a control routine that is to be executed by a parking control portion included in the electronic control apparatus shown in FIG. 1.

As shown in FIG. 3, the control routine is initiated with step S1 that is implemented to determine whether the P range is being selected by the range selection device 62. When one of non-P ranges other than the P range is being selected, one cycle of execution of the control routine is terminated. When the P range is being selected, step S2 and the subsequent steps are implemented. At step S2, the SBW actuator 40 of the electric parking device 30 is operated to the parking position, whereby, basically, the parking head 48 as well as the parking rod 46 is moved to the parking position. With the parking head 48 being moved to the parking position, the parking pawl 50 is meshed with the parking gear 52 thereby establishing the parking state in which the rotary shaft 54 and the wheel 22 are locked to be unrotatable. However, in this instance, when the P range is selected, there is a possibility of occurrence of the ratcheting in which the parking pawl 50 is repeatedly repelled by the plurality of teeth of the parking gear 52, due to rotation of the parking gear 52. If the ratcheting continues, there is a risk of reduction of durability of the parking pawl and the parking gear 52. Therefore, at step S3, it is determined whether the electric parking device 30 is in the ratcheting state or not, based on the ratcheting information Prt supplied from the ratcheting detection device 64. When it is determined that the electric parking device 30 is in the ratcheting state, step S4 and the subsequent steps are implemented. When it is not determined that the electric parking device 30 is in the ratcheting state, namely, when it is determined that the electric parking device 30 is in the ratcheting state, one cycle of execution of the control routine is terminated because the electric parking device 30 is appropriately placed in the parking state in which the parking pawl 50 is meshed with the parking gear 52.

At step S4 that is implemented when it is determined that the electric parking device 30 is in the ratcheting state, the running speed V in that instance (i.e., running speed V upon determination that the electric parking device 30 is in the ratcheting state is stored) is stored as a reference speed value V0, and a re-execution determination timer TO is set to a predetermined re-execution determination time value. The re-execution determination timer TO is reduced depending on an elapsed time from the determination at step S3 that the electric parking device 30 is in the ratcheting state, and becomes zero (T0=0) when the elapsed time becomes a re-execution determination time value that corresponds to a predetermined time value. At step S5, for preventing continuation of the ratcheting state, the SBW actuator 40 is returned to the non-parking position whereby the electric parking device 30 is switched to the non-parking position in which the parking pawl 50 is moved away from the parking gear 52. Step S5 is followed by step S6 at which a braking command is supplied to the braking control portion 14 such that a predetermined braking force is applied to the vehicle 8. In accordance with the braking command, the braking control portion 14 causes the electric wheel braking device 32 to be operated to generate the predetermined braking force, for example. In this instance, it is also possible to obtain the predetermined braking force by the regenerative control of the electric motor MG in place of or in addition to the operation of the electric wheel braking device 32. Each of the electric wheel braking device 32 and the electric motor MG corresponds to an electric braking device.

Figure 4:
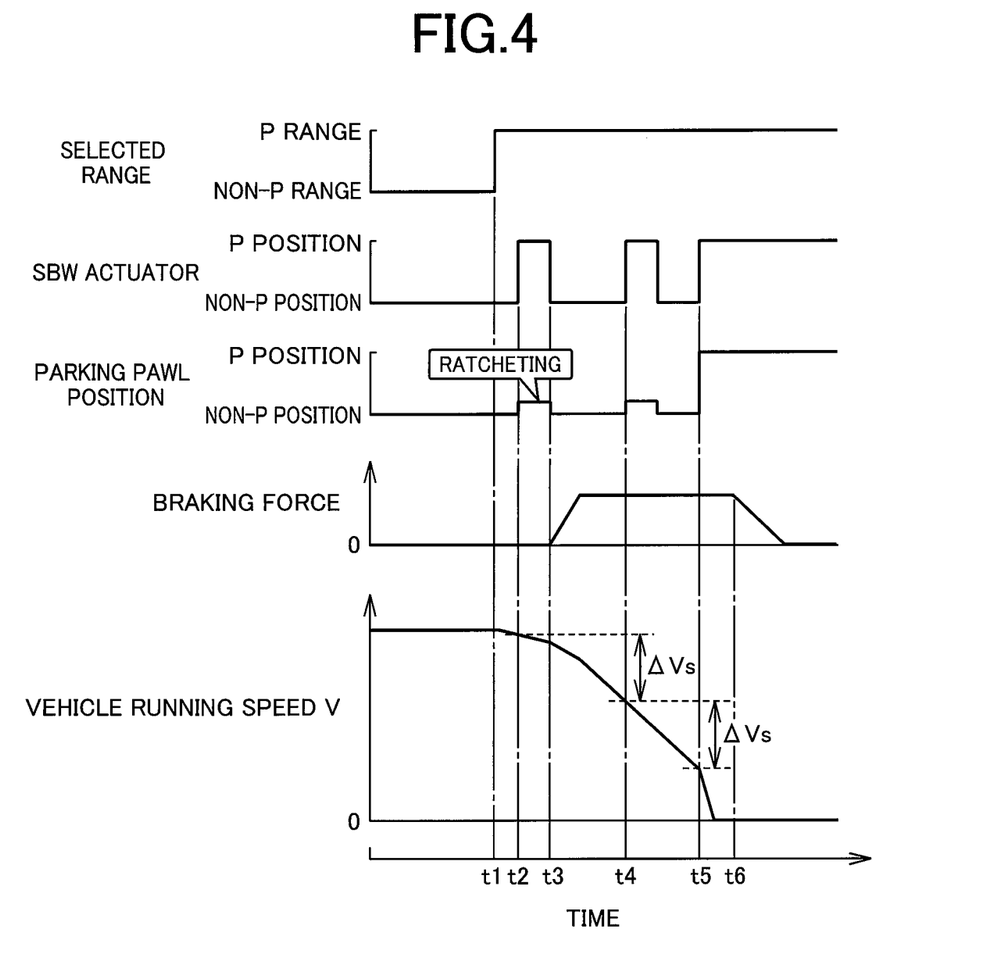
FIG. 4 is a time chat showing, by way of examples, changes of various parts in a case in which it is determined at step S7 of the control routine shown in FIG. 3 that a running-speed reduction value $\Delta V(=V0-V)$ has become at least a re-execution determination reduction value $\Delta Vs$, and step S8 and the subsequent steps are implemented.
Figure 5:
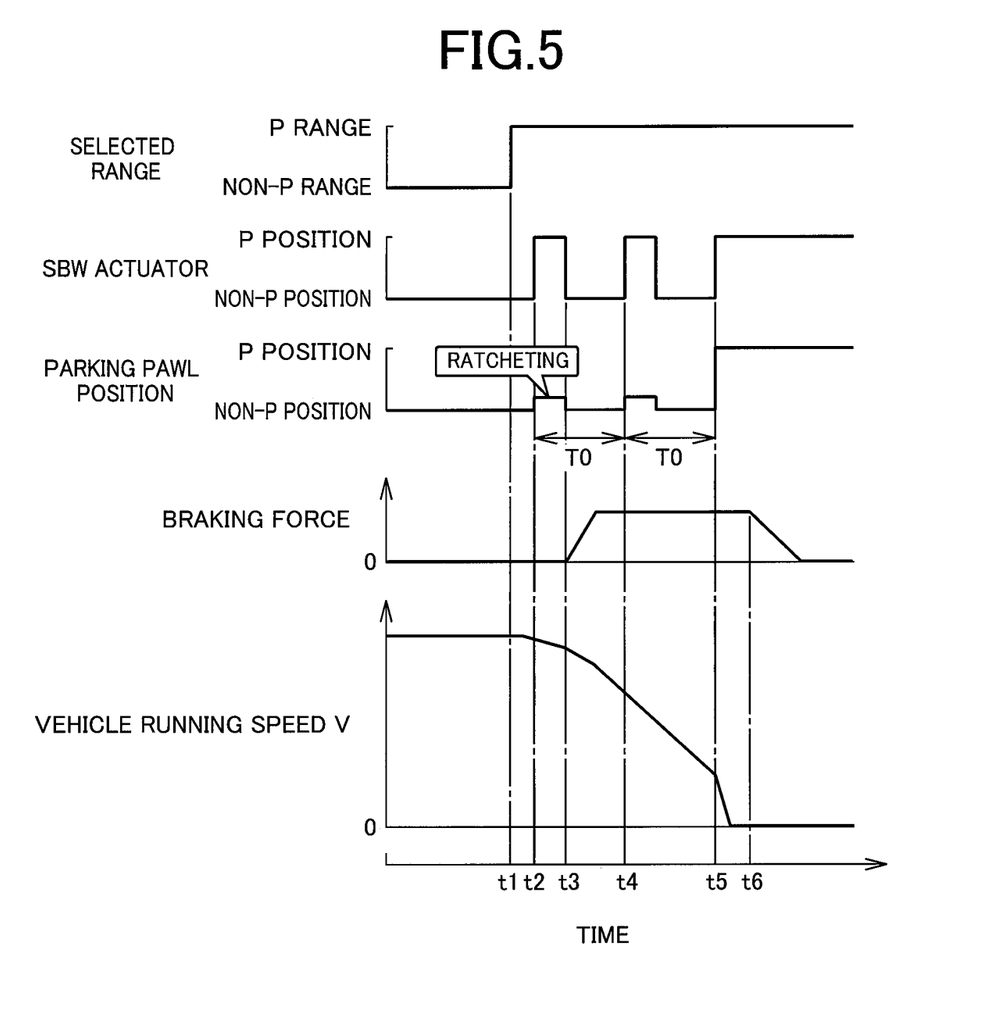
FIG. 5 is a time chat showing, by way of examples, changes of various parts in a case in which it is determined at step S7 of the control routine shown in FIG. 3 that a re-execution determination timer TO has become zero, and step S8 and the subsequent steps are implemented.

In each of FIGS. 4 and 5, a time t1 represents a point of time at which the P range is selected, and a time t2 represents a point of time at which the SBW actuator 40 is operated to the parking position (P position) by implementation of step S2. A time t3 represents a point of time at which it is determined that the electric parking device 30 is in the ratcheting state, whereby the SBW actuator 40 is returned to the non-parking position (non-P position) by implementation of step S5 and a control for applying the braking force is initiated by implementation of step S6. The braking force is increased at a predetermined rate to a predetermined value that may be either a constant value or a variable value that is variable depending on the running speed V, for example.

Referring back to FIG. 3, step S6 is followed by step S7 that is implemented to determine whether a running-speed reduction value $\Delta V(=V0-V)$, which is obtained by subtracting the actual running speed V from the reference speed value V0, has become at least a re-execution determination reduction value $\Delta Vs$ that corresponds to a predetermined reduction value, or not. When the running-speed reduction value $\Delta V$ has become at least the re-execution determination reduction value $\Delta Vs(\Delta Vs \leq \Delta V)$, step S8 is implemented to re-execute the parking control so as to switch the SBW actuator 40 to the parking position (P position), namely, so as to switch the electric parking device 30 to the parking state. Further, at step S7, it is also determined whether the re-execution determination timer T0 has become zero or not, namely, whether the elapsed time from the determination at step S3 that the electric parking device 30 is in the ratcheting state has become at least the re-execution determination time value that corresponds to the predetermined time value or not. When the re-execution determination timer T0 has become zero (T0=0), step S8 is implemented to re-execute the parking control so as to switch the SBW actuator 40 to the parking position (P position). That is, each of first and second conditions is a re-execution condition that is required to re-execute the parking control, wherein the first condition is that the running-speed reduction value $\Delta V$ has become at least the re-execution determination reduction value $\Delta Vs(\Delta Vs \leq \Delta V)$, and the second condition is that re-execution determination timer T0 has become zero (T0=0). Thus, with at least one of the first and second conditions being satisfied, step S8 is implemented to re-execute the parking control so as to switch the SBW actuator 40 to the parking position (P position). Each of the re-execution determination reduction value $\Delta Vs$ and the re-execution determination time value for the re-execution determination timer T0 may be either a predetermined constant value or a variable value that is variable depending on the running speed V, for example. It is noted that both of the above-described first and second conditions do not necessarily have to be set as the re-execution condition, as long as at least one of the first and second conditions is set as the re-execution condition.

Step S8 is followed by step S9 that is implemented to determine whether the electric parking device 30 is in the ratcheting state or not, based on the ratcheting information Prt, as at step S3. When it is determined that the electric parking device 30 is in the ratcheting state, the control flow goes back to step S4 and the subsequent steps. On the other hand, when it is not determined that the electric parking device 30 is in the ratcheting state, namely, when it is determined that the electric parking device 30 is in the ratcheting state, it can be determined that the electric parking device 30 is appropriately placed in the parking state in which the parking pawl 50 is meshed with the parking gear 52, so that step S10 is implemented to a brake releasing command is supplied to the braking control portion 14 for releasing the braking force, and then one cycle of execution of the control routine is terminated. At step S10, in accordance with the brake releasing command, the braking control portion 14 causes the braking force, which is generated by the electric wheel braking device 32 and/or by the regenerative control of the electric motor MG, to be gradually reduced at a predetermined rate. That is, when it is determined that the electric parking device 30 is in the ratcheting state, electric parking device 30 is switched to the non-parking position at step S5. After the braking force is started to be generate in accordance with the braking command at step S6, the generation of the braking force is continued even when the parking control is re-executed to switch the SBW actuator 40 to the parking position at step S6. The braking force is not released until the brake releasing command is outputted at step S10 after it is determined at step S9 that the electric parking device 30 is not in the ratcheting state. From a different point of view, the generation of the braking force is continued until the running-speed reduction value $\Delta V$, which is obtained by subtracting the actual running speed V from the reference speed value V0 (that is the running speed V upon the determination at step S3 that the electric parking device 30 is in the ratcheting state), has become at least the predetermined re-execution determination reduction value $\Delta Vs$. The re-execution determination reduction value $\Delta Vs$ can be regarded as a brake-keeping determination reduction value, with which the running-speed reduction value $\Delta V$ is to be compared for determining whether the generation of the braking force is to be continued or not. Further, the generation of the braking force is continued until the elapsed time from the determination at step S3 that the electric parking device 30 is in the ratcheting state, has become at least the re-execution determination time value for the re-execution determination timer T0. The re-execution determination timer T0 can be regarded as another brake-keeping determination reduction value, with which the elapsed time is to be compared for determining whether the generation of the braking force is to be continued or not.

In FIG. 4, a time t4 represents a point of time at which the running-speed reduction value $\Delta V(=V0-V)$ that is obtained by subtracting the actual running speed V from the reference speed value V, has become the re-execution determination reduction value $\Delta Vs$ whereby an affirmative determination is made at step S7, and step S8 and the subsequent steps are implemented to re-execute the parking control so as to switch the SBW actuator 40 to the parking position, namely, so as to switch the electric parking device 30 to the parking state. FIG. 4 shows a case in which it is determined again at step S9 that the electric parking device 30 is in the ratcheting state whereby step S4 and the subsequent steps are implemented, and then the running-speed reduction value ΔV has become at least the re-execution determination reduction value ΔVs(ΔVs≤ΔV) whereby the parking control is re-executed at a time t5. As a result of re-execution of the parking control, the electric parking device 30 is placed in the parking state so that a negative determination is made at step S9 whereby step S10 is implemented to release the braking force at a constant change rate at a time t6.

FIG. 5 shows a case in which an affirmative determination is made at step S7 at a time t4 since the re-execution determination timer T0 has become zero whereby step S8 and the subsequent steps are implemented to re-execute the parking control so as to switch the SBW actuator 40 to the parking position, namely, so as to switch the electric parking device 30 to the parking state. In the case shown in FIG. 5, it is determined again at step S9 that the electric parking device 30 is in the ratcheting state whereby step S4 and the subsequent steps are implemented, and then the re-execution determination timer T0 has become zero (T0=0) whereby the parking control is re-executed at a time t5. As a result of re-execution of the parking control, the electric parking device 30 is placed in the parking state so that a negative determination is made at step S9 whereby step S10 is implemented to release the braking force at a constant change rate at a time t6.

In the case shown in FIG. 4, the two-time re-executions of the parking control at the respective times t4 and t5 are made as a result of satisfaction of the above-described first condition which is that the running-speed reduction value ΔV has become at least the re-execution determination reduction value ΔVs(ΔVs≤ΔV). In the case shown in FIG. 5, the two-time re-executions of the parking control at the respective times t4 and t5 are made as a result of satisfaction of the above-described second condition which is that the re-execution determination timer T0 has become zero (T0=0). However, for example, in the case shown in FIG. 5, the second-time execution of the parking control at the time t5 may be made as a result of satisfaction of the above-described first condition (ΔVs≤ΔV). That is, the affirmative determination is made at step S7 when one of the above-described first condition (ΔVs≤ΔV) and the above-described second condition (T0=0), each of which corresponds to the re-execution condition, is satisfied, whereby step S8 is implemented.

In the electronic control apparatus 10 for the vehicle 8 according to the present embodiment, the parking control portion 16 is configured, when being to execute the parking control, to determine whether or not the electric parking device 30 is in the ratcheting state, and is configured, when determining that the electric parking device 30 is in the ratcheting state (affirmative determination in step S3), to stop the parking control so as to move the parking pawl 50 to the non-parking position, so that it is possible to appropriately suppress occurrence of the ratcheting of the electric parking device 30 regardless of individual differences for each vehicle 8, such as dimensional errors of the parking pawl 50 and the parking gear 52, and accuracy errors of the vehicle-information detection devices 60 such as the vehicle running speed sensor.

Further, when the re-execution condition is satisfied, namely, when an affirmative determination is made at step S7, after the parking control has been stopped, the parking control is re-executed at step S8 so that it is possible to quickly position the parking pawl 50 into the parking position, namely, to quickly switch the electric parking device 30 to the parking state by re-executing the parking control, while suppressing occurrence of the ratcheting. Particularly, where the re-execution of the parking control is made depending on the running-speed reduction value ΔV, i.e., an amount of reduction of the rotational speed of the parking gear 52, so that the parking pawl 50 is more likely to be meshed with the parking gear 52 by the reduction of the rotational speed of the parking gear 52, thereby reducing a number of times of occurrence of the ratcheting and also a number of times of execution of the parking control, and accordingly reducing consumption of an electric power.

Further, when the parking control is stopped by determination that the electric parking device 30 is in the ratcheting state, the braking force to the vehicle 8 is generated by the electric braking device in the form of the electric wheel braking device 32 and the electric motor MG that is subjected to the regenerative control, so that it is possible to obtain a certain amount of the braking force in spite of stop of execution of the parking control, thereby preventing the driver of the vehicle 8 from feeling discomfort. Further, the running speed V of the vehicle 8 is reduced by the braking force generated by the electric braking device whereby the rotational speed of the parking gear 52 is reduced, so that the electric parking device 30 can be quickly switched to the parking state in which the parking pawl 50 is meshed with the parking gear 52, by the re-execution of the parking control. Further, when the parking control portion 16 becomes determining that the electric parking device 30 is not in the ratcheting state, namely, when a negative determination is made at step S9, the generation of the braking force by the electric braking device is stopped at step S10, so that application of the braking force can be controlled to the minimum required.

Figure 6:
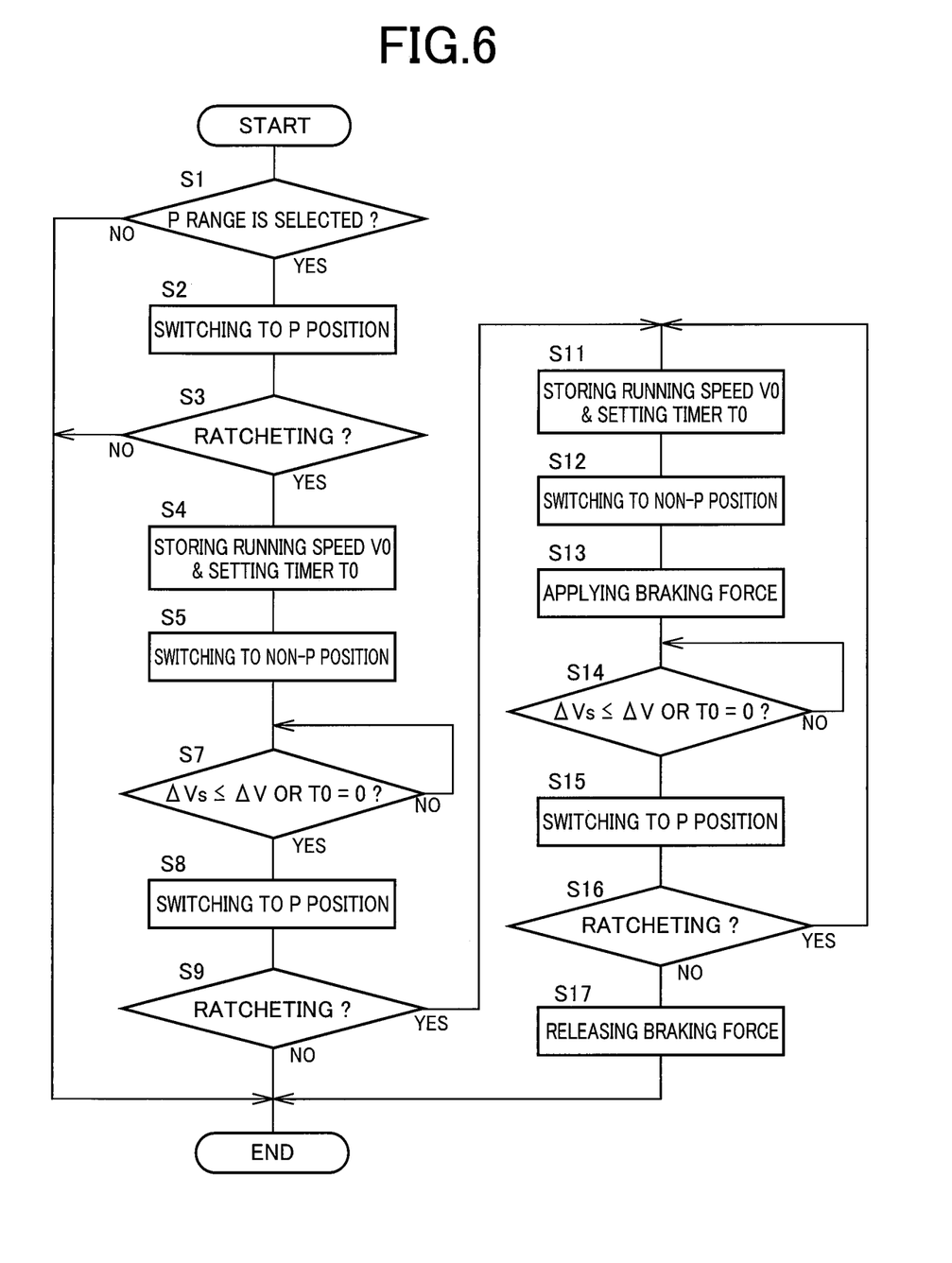
FIG. 6 is a flow chart showing a control routine that is to be executed, in place of the control routine shown in the flow chart of FIG. 3, by the parking control portion in another embodiment of the present invention.

In the above-described embodiment, when it is determined that the electric parking device 30 is in the ratcheting state during first execution of the parking control, the parking control is stopped at step S5 and the braking force is generated by the electric braking device at step S6. However, as shown in a flow chart of FIG. 6, step S6 may be omitted, so that the braking force is generated by the electric braking device at step S13 in a case in which it is determined again at step S9 that the electric parking device 30 is in the ratcheting state during the re-execution of the parking control at step S8, which is made as a result of satisfaction of the re-execution condition at step S7. That is, in another embodiment of the present invention shown in FIG. 6, the braking force is generated in the case in which the ratcheting is repeated without the running speed V being sufficiently reduced, so that application of the braking force can be controlled to the minimum required. It is noted that steps S11 through S17 in FIG. 6 are substantially the same as steps S4 through S10 in FIG. 3 in the above-described embodiment, and that detailed description thereof is not provided.

While the preferred embodiments of this invention have been described in detail by reference to the drawings, it is to be understood the embodiments described above are given for illustrative purpose only, and that the present invention may be embodied with various modifications and improvements which may occur to those skilled in the art.

NOMENCLATURE OF ELEMENTS

8: vehicle
10: electronic control apparatus (control apparatus)
14: braking control portion
16: parking control portion
22: wheel 30: electric parking device
32: electric wheel braking device (electric braking device)
50: parking pawl
52: parking gear
62: range selection device
64: ratcheting detection device
MG: electric motor (electric braking device)
V0: reference speed value
ΔVs: re-execution determination reduction value (re-execution condition)
T0: re-execution determination timer (re-execution condition)

What is claimed is:

1. A control apparatus for a vehicle that is provided with (i) a wheel, (ii) an electric parking device which includes a parking gear that is to be rotated in conjunction with the wheel and a parking pawl that is to be meshed with the parking gear, and which is configured to lock rotation of the wheel by causing the parking pawl to be meshed with the parking gear through an electric control, and (iii) a range selection device capable of selecting a plurality of ranges that establish respective different driving states of the vehicle, wherein the plurality of ranges include a parking range that causes the wheel to be locked to be unrotatable by the electric parking device, the control apparatus comprising a parking control portion configured, when the parking range is selected, to execute a parking control for moving the parking pawl to a parking position in which the parking pawl is meshed with the parking gear in the electric parking device, wherein the parking control portion is configured, when being to execute the parking control, to determine whether or not the electric parking device is in a ratcheting state in which the parking pawl is repelled by the parking gear without the parking pawl being meshed with the parking gear, and is configured, when determining that the electric parking device is in the ratcheting state, to stop the parking control so as to move the parking pawl to a non-parking position in which meshing of the parking pawl with the parking gear is released.

2. The control apparatus according to claim 1,
wherein the parking control portion is configured, after stopping the parking control by determining that the electric parking device is in the ratcheting state, to re-execute the parking control when a predetermined re-execution condition is satisfied.

3. The control apparatus according to claim 2,
wherein the re-execution condition is that an actual value of a running speed of the vehicle has been reduced from a reference speed value, which is the running speed upon determination that the electric parking device is in the ratcheting state, by at least a predetermined reduction value.

4. The control apparatus according to claim 2,
wherein the re-execution condition is that an elapsed time from determination that the electric parking device is in the ratcheting state, has become at least a predetermined time value.

5. The control apparatus according to claim 1,
wherein the vehicle is provided with an electric braking device configured to electrically control a braking force of the vehicle, and
wherein the control apparatus includes a braking control portion that is configured to cause the electric braking device to generate the braking force when the parking control portion stops the parking control by determining that the electric parking device is in the ratcheting state.

6. The control apparatus according to claim 5,
wherein the braking control portion is configured to keep the electric braking device to generate the braking force, until an actual value of a running speed of the vehicle has been reduced from a reference speed value, which is the running speed upon determination that the electric parking device is in the ratcheting state, by at least a predetermined reduction value.

7. The control apparatus according to claim 5,
wherein the braking control portion is configured to keep the electric braking device to generate the braking force, until an elapsed time from determination that the electric parking device is in the ratcheting state, has become at least a predetermined time value.

8. The control apparatus according to claim 5,
wherein, when the parking control portion re-executes the parking control when a predetermined re-execution condition is satisfied, the braking control portion is configured to keep the electric braking device to generate the braking force.

9. The control apparatus according to claim 8,
wherein the parking control portion is configured, when the re-execution condition is satisfied, to re-execute the parking control and to determine whether the electric parking device is in the ratcheting state or not, and is configured to repeat re-execution of the parking control upon satisfaction of the re-execution condition, until determining that the electric parking device is not in the ratcheting state, and
wherein the braking control portion is configured to stop the electric braking device to generate the braking force, when the parking control portion becomes determining that the electric parking device is not in the ratcheting state.

10. The control apparatus according to claim 2,
wherein the vehicle is provided with an electric braking device configured to electrically control a braking force of the vehicle, and
wherein the control apparatus includes a braking control portion that is configured to cause the electric braking device to generate the braking force, in a case in which the parking control portion stops the parking control by determining again that the electric parking device is in the ratcheting state, when re-executing the parking control upon satisfaction of the predetermined re-execution condition.

11. The control apparatus according to claim 10,
wherein the parking control portion is configured, when the re-execution condition is satisfied, to re-execute the parking control and to determine whether the electric parking device is in the ratcheting state or not, and is configured to repeat re-execution of the parking control upon satisfaction of the re-execution condition, until determining that the electric parking device is not in the ratcheting state, and
wherein the braking control portion is configured to keep the electric braking device to generate the braking force, until the parking control portion becomes determining that the electric parking device is not in the ratcheting state.

* * * * *